(12) United States Patent
Quehenberger et al.

(10) Patent No.: US 9,512,907 B2
(45) Date of Patent: Dec. 6, 2016

(54) POWER DIVIDER

(71) Applicant: MAGNA Powertrain AG & Co KG, Lannach (AT)

(72) Inventors: Johannes Quehenberger, Raaba (AT); Herbert Steinwender, Haselsdorf-Tobelbad (AT)

(73) Assignee: Magna Powertrain AG & Co KG, Lannach (AT)

( * ) Notice: Subject to any disclaimer, the term of this patent is extended or adjusted under 35 U.S.C. 154(b) by 60 days.

(21) Appl. No.: 14/172,219

(22) Filed: Feb. 4, 2014

(65) Prior Publication Data
US 2014/0335984 A1 Nov. 13, 2014

(30) Foreign Application Priority Data

Feb. 6, 2013 (DE) .................. 10 2013 002 379
Mar. 20, 2013 (DE) .................. 10 2013 204 921

(51) Int. Cl.
| | |
|---|---|
| F16H 61/02 | (2006.01) |
| F16H 7/06 | (2006.01) |
| B60K 17/35 | (2006.01) |
| B60K 23/08 | (2006.01) |

(52) U.S. Cl.
CPC ............ F16H 7/06 (2013.01); B60K 17/35 (2013.01); B60K 23/0808 (2013.01); F16H 61/0206 (2013.01); F16H 61/0267 (2013.01)

(58) Field of Classification Search
CPC .................. F16H 61/0206; F16H 61/0267
See application file for complete search history.

(56) References Cited

U.S. PATENT DOCUMENTS

| | | | | |
|---|---|---|---|---|
| 2,726,557 A | * | 12/1955 | Ackerman | F15B 21/045 137/468 |
| 2,740,304 A | * | 4/1956 | Sheppard | F16H 61/0267 477/135 |
| 2,857,780 A | * | 10/1958 | Ball | F16H 61/0267 477/141 |
| 2,932,977 A | * | 4/1960 | Ball | F16H 47/08 477/141 |
| 3,103,831 A | * | 9/1963 | De Corte | F16H 47/085 477/118 |

(Continued)

FOREIGN PATENT DOCUMENTS

| | | |
|---|---|---|
| CN | 1513692 A | 7/2004 |
| CN | 101445055 A | 6/2009 |

(Continued)

OTHER PUBLICATIONS

Search Report dated Nov. 24, 2015 from corresponding Chinese patent application Serial No. CN201400448978.

*Primary Examiner* — Paul N Dickson
*Assistant Examiner* — Daniel Yeagley
(74) *Attorney, Agent, or Firm* — Dickinson Wright PLLC (57) ABSTRACT

A distribution gearbox for distributing a drive torque of a drive unit of a motor vehicle to a first axle and a second axle of the motor vehicle, and including a housing, an input shaft, a clutch unit which is seated coaxially with respect to the input shaft, and a chain sprocket which can be driven by the clutch unit and by way of which a drive moment of the input shaft can be transmitted to an output shaft, wherein the chain sprocket is mounted on a neck-shaped reduced portion of the housing.

10 Claims, 9 Drawing Sheets

(56) References Cited

U.S. PATENT DOCUMENTS

| | | | | |
|---|---|---|---|---|
| 3,407,893 A * | 10/1968 | Hill | ............... | B60K 17/3465 180/249 |
| 3,714,836 A * | 2/1973 | Pierce, Jr. | ............... | F16H 41/24 475/120 |
| 4,431,073 A * | 2/1984 | Nagao | ............... | B60K 17/043 180/307 |
| 4,444,073 A * | 4/1984 | Moroto | ............... | B60K 23/08 180/247 |
| 4,718,303 A * | 1/1988 | Fogelberg | ............... | B60K 17/3462 180/249 |
| 4,848,508 A * | 7/1989 | Smirl | ............... | B60K 17/3465 180/197 |
| 5,044,892 A * | 9/1991 | Pettitt | ............... | F04B 27/1009 184/6.17 |
| 5,083,986 A * | 1/1992 | Teraoka | ............... | B60K 17/3462 192/35 |
| 5,651,749 A * | 7/1997 | Wilson | ............... | B60K 17/3462 180/247 |
| 5,665,020 A * | 9/1997 | Kamada | ............... | F16H 61/0206 475/127 |
| 5,702,321 A * | 12/1997 | Bakowski | ............... | B60K 17/3467 180/249 |
| 5,704,867 A * | 1/1998 | Bowen | ............... | B60K 17/3462 475/205 |
| 5,718,653 A * | 2/1998 | Showalter | ............... | B60K 17/3467 180/249 |
| 5,856,709 A * | 1/1999 | Ibaraki | ............... | B60K 6/36 180/165 |
| 5,915,513 A | 6/1999 | Isley, Jr. et al. | | |
| 8,277,359 B2 * | 10/2012 | Sakaue | ............... | F16H 57/023 384/620 |
| 2002/0137591 A1 * | 9/2002 | Frost | ............... | B60K 17/3467 475/288 |
| 2008/0308354 A1 | 12/2008 | Gratzer et al. | | |
| 2009/0215567 A1 * | 8/2009 | Iwasaki | ............... | F16D 55/40 475/116 |

FOREIGN PATENT DOCUMENTS

| | | | |
|---|---|---|---|
| CN | 102414481 A | 4/2012 | |
| DE | 3705064 A1 | 2/1988 | |
| DE | 3805284 A1 | 9/1988 | |
| DE | 102007057984 A1 | 6/2009 | |
| EP | 1582777 A2 | 10/2005 | |
| GB | 1415872 A * | 12/1975 | ............ F16C 19/381 |
| JP | 2686290 B2 | 12/1997 | |
| KR | 1019990023682 | 3/1999 | |
| KR | 1020100007783 A | 1/2010 | |
| KR | 1020100118453 A | 5/2010 | |

* cited by examiner

POWER DIVIDER

CROSS-REFERENCE TO RELATED APPLICATIONS

This application is based on and claims priority to German Application No. DE102013002379.3, filed on Feb. 6, 2013 and German Application No. DE102013204921.8, filed on Mar. 20, 2013 in Germany, which are both hereby incorporated by reference in their entirety.

TECHNICAL FIELD

The present disclosure relates generally to distribution gearboxes that are operable for distributing drive torque produced by a drive unit of a motor vehicle to a first axle and a second axle of the motor vehicle.

BACKGROUND

The statements in this section merely provide background information related to the present disclosure and may not necessarily constitute prior art.

Distribution gearboxes, commonly referred to as transfer gearboxes, are gearboxes that are operable for splitting a drive torque produced by the drive unit of a motor vehicle to a plurality of outputs. Transfer gearboxes of this type are typically used in motor vehicles having a drivetrain configured to provide either permanent or switchable four-wheel or all-wheel drive modes of operation. Such transfer gearboxes are typically operable to distribute the drive torque produced by the drive unit to two driven axles of the vehicle, the distribution being predefined or capable of being freely selected depending on the particular design of the transfer gearbox. In order for it to be possible to control the transmission and distribution of drive torque to the two axles of the motor vehicle, a clutch unit is provided which, for example, affords the option to the driver of the motor vehicle to select between a first or permanent two-wheel drive mode, in which the drive of the vehicle takes place exclusively via a primary axle, and a second or automatic four-wheel drive mode, which is also known as an "on-demand drive mode". In this second mode, a certain proportion of the drive torque is transmitted to the wheels of the other axle (a secondary axle) depending on the driving conditions, in order to provide temporary four-wheel drive.

EP 1 582 777 A2 discloses a distribution gearbox equipped with a chain sprocket. The chain sprocket is mounted by means of a dedicated bearing with respect to the housing.

The centre differential for a vehicle with four-wheel drive in accordance with DE 38 05 284 A1 has an input shaft, a clutch and a chain sprocket, the latter being mounted on both sides in a manner which is fixed to the housing. DE 37 05 064 A1 also discloses a mounting of this type.

The distribution gearbox of US 2008/308354 A1 discloses a mounting of the chain sprocket on the input shaft by means of radial needle bearings.

DE 10 2007 057 984 A1 describes a distribution gearbox with a chain drive and a clutch. Lubricant is delivered by a delivery device from an oil sump which lies below the chain drive into regions which are situated above.

SUMMARY

This section provides a general summary of the disclosure and is not intended to be a comprehensive disclosure of its full scope or all of its features, aspects and objectives.

It is an object of the present disclosure to provide a distribution gearbox in a form which is improved with respect to the known solutions.

This object is achieved by a distribution gearbox configured and operable for distributing a drive torque produced by a drive unit of a motor vehicle to a first axle and a second axle of the motor vehicle, and which includes a housing, an input shaft, a clutch unit which is seated coaxially with respect to the input shaft, and a chain sprocket associated with a power transfer mechanism which can be driven by the clutch unit and by way of which a drive movement of the input shaft can be transmitted through the power transfer mechanism to an output shaft, and wherein the chain sprocket is mounted on a neck-shaped reduced portion of the housing.

Furthermore, the function and construction of a distribution gearbox and a transfer gearbox are described first of all, in which the present invention is preferably used.

Further areas of applicability will become apparent from the detailed description provided herein. The description and specific examples in this summary are intended for purposes of illustration only and are not intended to limit the scope of the present disclosure.

DRAWINGS

The drawings described herein are for illustrative purposes only of selected embodiments and not all possible embodiments and/or implementation covered by the present disclosure, it being understood that the drawings are not intended to limit the scope of the present disclosure.

FIG. 8 is a partial sectional view of another transfer gearbox constructed in accordance with a third embodiment of the present disclosure and which is also adapted for use with the drivetrain of FIG. 1.

DESCRIPTION

The following description is merely exemplary in nature and is not intended to limit the present disclosure, its applications, configurations or uses. It should be understood that throughout the drawings, corresponding reference numerals indicate similar or corresponding parts and features.

The present disclosure is generally related to distribution gearboxes, otherwise known and referred to as transfer gearboxes or transfer cases, of the type adapted for use in a drivetrain of a motor vehicle for distributing drive torque produced by a drive unit to a first or primary axle and a second or secondary axle. The transfer gearbox may include an input shaft driven by the power unit, a first output shaft arranged to transfer drive torque from the input shaft to the first axle, a second output shaft drivingly connected to the second axle, a power transfer mechanism drivingly connected to the second output shaft, and a clutch unit that can be selectively or automatically actuated to connect one of the input shaft and the first output shaft to the power transfer mechanism for transferring a portion of the drive torque to the second axle.

Accordingly, the present disclosure is generally related to transfer gearboxes of the type adapted for use in the all-wheel drive or four-wheel drive drivetrains of motor vehicles. The present disclosure is furthermore generally directed to an arrangement for rotatably mounting a rotary component of the power transfer mechanism on a neck-shaped hub portion of a housing associated with the transfer gearbox. The present disclosure is furthermore generally directed to arrangements for lubricating rotary components associated with the transfer gearbox.

Figure 1:
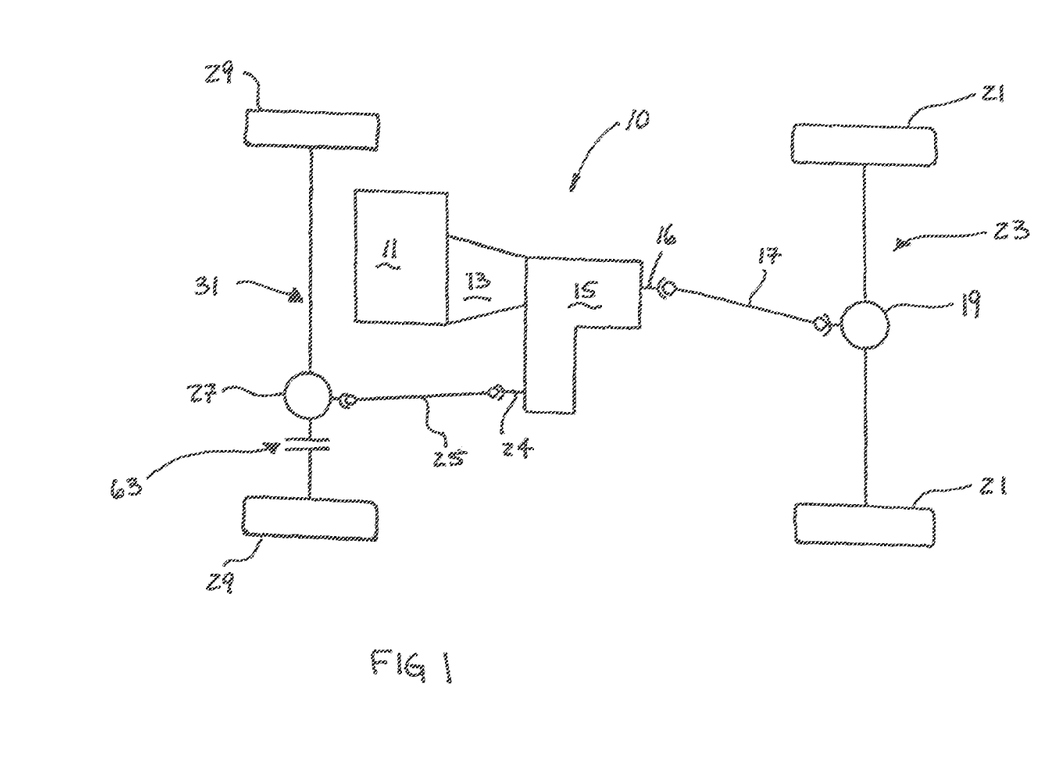
FIG. 1 is a diagrammatical illustration of an exemplary drivetrain for a motor vehicle equipped with a transfer gearbox constructed in accordance with the teachings of the present disclosure.

With reference now to the drawings, FIG. 1 diagrammatically illustrates a drivetrain 10 of a motor vehicle configured to provide switchable (i.e. selectively and/or automatically) all-wheel drive modes of operation. The drive torque which is produced by a drive unit, such as a motor 11, for example an internal combustion engine or an electric motor (a hybrid drive of any desired configuration is also conceivable), is fed to a transfer gearbox 15 via a main gearbox 13, which may for example include a manual change-speed gearbox or an automatic gearbox. A first output 16 of transfer gearbox 15 is coupled via a first cardan shaft 17 to the input of a rear-axle differential gearbox 19. As a result, rear wheels 21 of a rear axle 23 of the motor vehicle are driven permanently. Rear axle 23 therefore forms a first or primary axle of the motor vehicle. A second output 24 of transfer gearbox 15 is coupled via a second cardan shaft 25 to the input of a front-axle differential gearbox 27. As a result, part of the drive torque produced by the drive unit 11 can optionally be transmitted to front wheels 29 of a front axle 31. Front axle 31 therefore forms a second or secondary axle of the motor vehicle. A disconnect clutch 63 is also shown to be provided between front-axle differential gearbox 27 and one of front wheels 29 of front axle 31 (the left-hand front wheel of the vehicle), the function of disconnect clutch 63 will be explained in greater detail hereinafter.

Figure 2A:
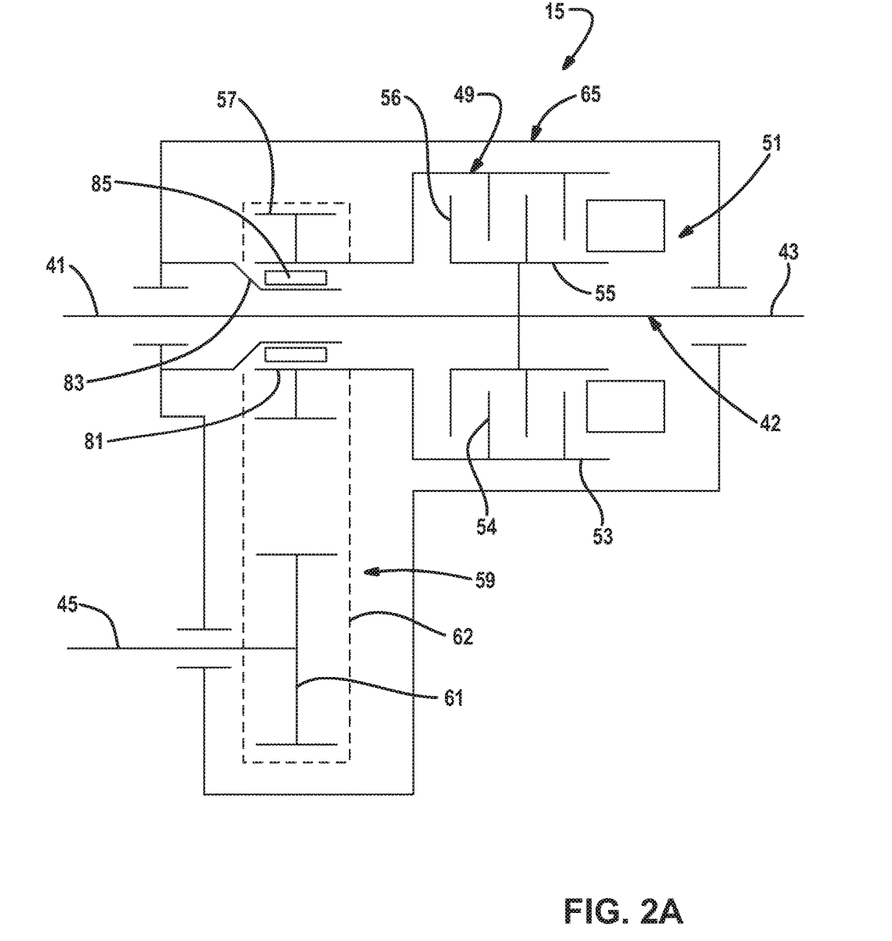
FIGS. 2A and 2B are diagrammatic views of exemplary transfer gearboxes adapted for use with the drivetrain shown in FIG. 1.
Figure 2B:
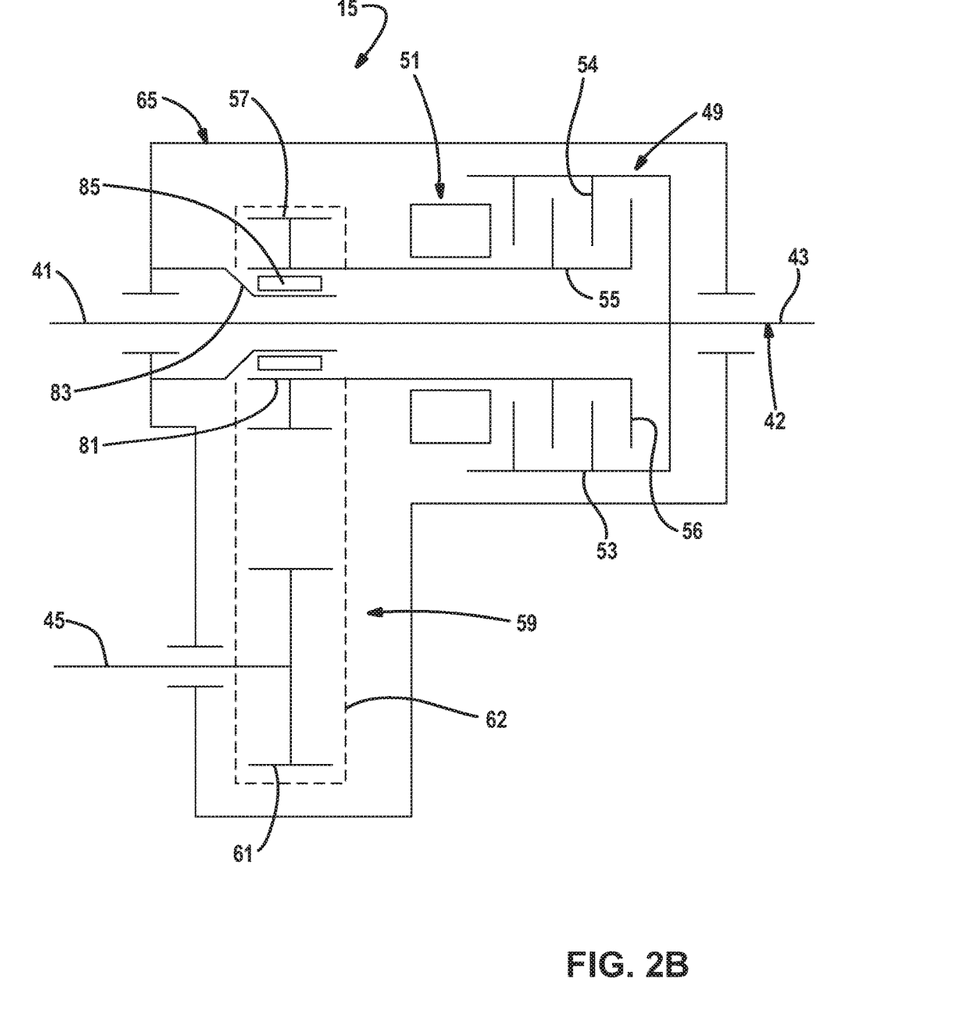

FIGS. 2A and 2B illustrate diagrammatic views of transfer gearboxes 15 adapted for use with drivetrain 10 of FIG. 1. Transfer gearbox 15 shown in each of FIGS. 2A and 2B include an input shaft 41, a first output shaft 43 (associated with first output 16), and a second output shaft 45 (associated with second output 24). Transfer gear boxes 15 also include a housing 65 configured to rotatably support input shaft 41, first output shaft 43 and second output shaft 45. Input shaft 41 is configured for connection to a rotary output (not shown) of main gearbox 13 for receiving drive torque from drive unit 11. First output shaft 43 is coaxial with respect to input shaft 41 and is configured fixedly with the latter so as to rotate with it. Preferably, input shaft 41 and first output shaft 43 are formed to define an integrated shaft, hereinafter referred to as mainshaft 42, that is configured to directly interconnect the output of main gearbox 13 to first cardan shaft 17. Second output shaft 45 is arranged offset and in parallel to input shaft 41 and first output shaft 43. Furthermore, transfer gearbox 15 comprises a clutch unit 47 having a friction clutch 49 and a clutch actuator 51.

In accordance with the embodiment of transfer gearbox 15 shown in FIG. 2B, friction clutch 49 includes a clutch basket 53 which is connected fixedly to the input shaft 41 (and/or first output shaft 43) so as to rotate therewith and supports a plurality of outer clutch discs 54. Furthermore, friction clutch 49 also includes a rotatably mounted clutch hub 55 which likewise supports a plurality of inner clutch discs 56 which are arranged in an alternating configuration with outer clutch discs 54 to define a multi-plate clutch pack. Clutch hub 55 is fixed for rotation with a drive gearwheel 57 of a power transfer mechanism, shown as a chain drive assembly 59. Drive gearwheel 57 is shown to be rotatably supported on a neck portion 83 of housing 65. An output gearwheel 61 of chain drive assembly 59 is fixedly connected for rotation with second output shaft 45. Chain drive assembly 59 further includes a continuous drive chain 62 that encircles and connects drive gearwheel 57 for common rotation with output gearwheel 61 and second output shaft 45. Instead of chain drive assembly 59, the power transfer mechanism can be configured as a gear drive assembly having, for example, an intermediate gearwheel meshed between the gearwheels 57, 61. Moreover, in a deviation from the design of transfer gearbox 15 shown in FIG. 2B, FIG. 2A illustrates a transfer gearbox 15 having its clutch hub 55 connected fixedly to at least one of shafts 41, 43 so as to rotate with them. In this case, clutch basket 53 is connected fixedly to drive gearwheel 57 so as to rotate with power transfer mechanism 59. Drive gearwheel 57 is again shown to be rotatably supported on neck portion 83 of housing 65. It goes without saying that clutch actuator 51 can be expediently be arranged differently to what is illustrated.

By way of actuation of clutch unit 47 via actuation of clutch actuator 51 in the engaging direction of friction clutch 49, an increasing proportion of the drive torque which is introduced into transfer gearbox 15 via input shaft 41 can be transmitted via power transfer mechanism 59 to second output shaft 45.

If, however, clutch unit 47 is open and friction clutch 49 is released, the components of drivetrain 10 which are assigned to second output shaft 45 also rotate during driving of the motor vehicle, although no drive torque is transmitted via this portion of drivetrain 10. In order to prevent this, disconnect clutch 63 which has already been mentioned in the above text is provided at front axle 31 (secondary axle). If disconnect clutch 63 is opened in the case of an open clutch unit 47, that portion of drivetrain 10 which lies in between is brought to a standstill, which ultimately prevents chain drive assembly 59 from also being rotated unnecessarily. This method of operation is also called the disconnect mode.

Disconnect clutch 63 may be, for example, a claw clutch. It can be provided that disconnect clutch 63 is assigned a dedicated control unit. It is advantageous in many cases, however, if clutch unit 47 and disconnect clutch 63 are actuated by a common control unit.

Figure 3:
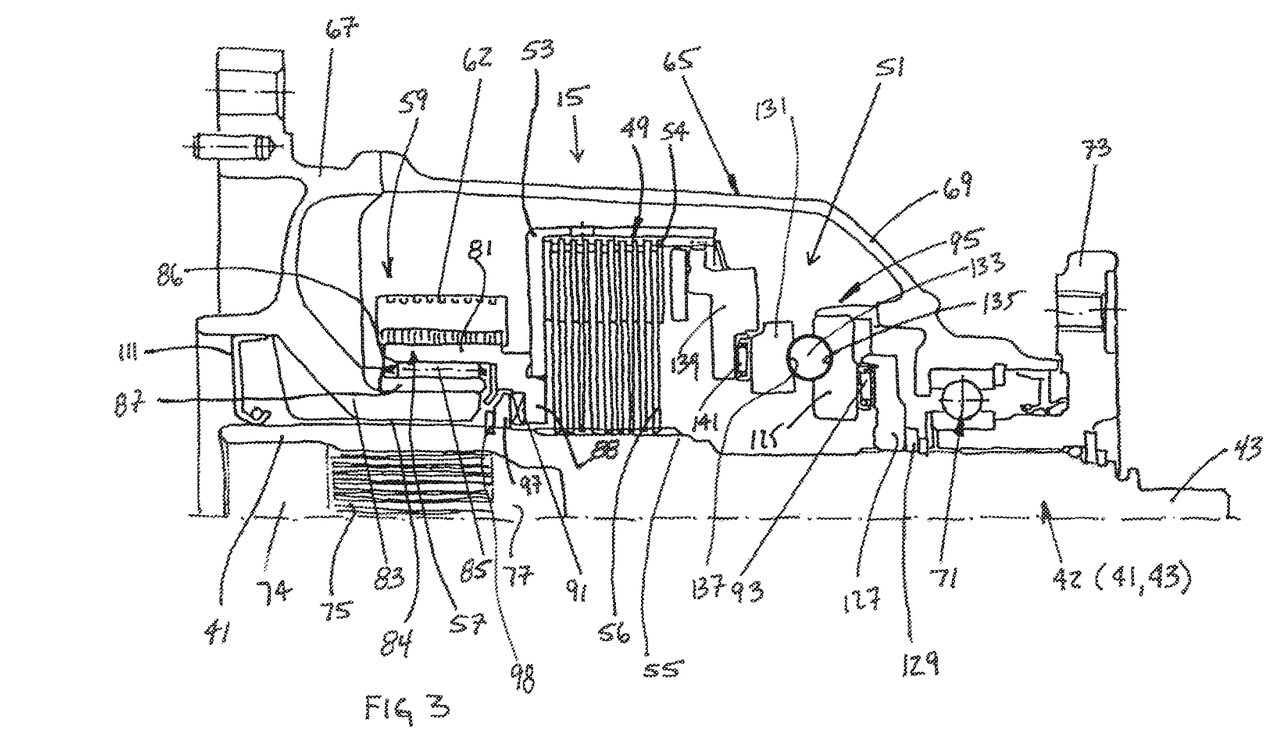
FIG. 3 is a partial sectional view of a transfer gearbox constructed in accordance with a first embodiment of the present disclosure and adapted for use with the drivetrain of FIG. 1.

FIG. 3 illustrates a bearing mounting arrangement for transfer gearbox 15 and is shown to include one-piece mainshaft 42 having an input shaft portion 41 and a first output shaft portion 43. The components are accommodated in housing 65 which is, for example, formed as a multi-piece housing to include a first housing section 67 and a second housing section 69. Mainshaft 42 is mounted for rotation in housing 65 via a groove ball bearing assembly 71 with respect to second housing section 69 in the region of a co-rotating flange 73 that is fixed for rotation with output shaft portion 43 of mainshaft 42. Groove ball bearing assembly 71 serves as a locating bearing.

Mainshaft 42 has its input shaft portion 41 supported at the gearbox output via a centering seat 74. Here, the output of main gearbox 13 is to be understood to mean the output shaft of a gearbox which is to be shifted manually or automatically. The gearbox output shaft will have a splined portion with external splines sized to engage internal splines 75 formed in a corresponding shaft cavity 77, and a non-splined portion adapted to be retained in centering seat 74, thereby supporting mainshaft 42 on the input side portion 41. As a result, an input-shaft bearing assembly (typically located on the left between input shaft 41 and first housing section 67) can be omitted as shown in the embodiment illustrated. It can also be provided in accordance with a further embodiment to arrange a small, radial supporting bearing which is considerably reduced in comparison to an otherwise customary size at this point between first housing section 67 of housing 65 and input shaft 41.

With continued reference to FIG. 3, a cylindrical hub portion 81 of drive gearwheel 57 is shown to be rotatably mounted directly at an inlet neck portion 83 of first housing section 67 via a radial needle bearing 85 and which absorbs the entirety of the radial tensile forces of drive gearwheel 57 and chain 62. Inlet neck portion 83 of first housing section 67 defines an annular axially-extending hub having an inner cylindrical surface 84 surrounding input shaft portion 41 of mainshaft 42 and an outer cylindrical surface 86. A sleeve 87 associated with radial needle bearing 85 is press-fit onto outer cylindrical surface 86 of inlet neck portion 83 of first housing section 67. Drive gearwheel 57 also includes a radial plate segment 88 to which clutch basket 53 of friction clutch 49 is fixedly connected. Thus, drive gearwheel 57 and clutch basket 53 are fixed for common rotation. Clutch hub 55 of friction clutch 49 is shown in FIG. 3 to be integrally formed with mainshaft 42. As such, inner clutch plates 56 rotate with mainshaft 42 and outer clutch plates 54 rotate with clutch basket 53. The prevailing method of operation is the disconnect mode—the all-wheel drive function, when portions of drivetrain 10 are at a standstill. Accordingly, chain 62 does not circulate, and chain sprocket 57 is at rest. As a result, radial needle bearing 85 does not produce any losses. In addition, radial needle bearing 85 does not have to be lubricated in this mode of operation.

The actuator system associated with clutch unit 47 requires axial support. In the exemplary embodiment of FIG. 3, this takes place by way of first and second axial needle bearings 91 and 93 respectively. Axial needle bearings 91 and 93 support the axial forces associated with a ball ramp mechanism 95 associated with clutch actuator 51 via mainshaft 42. Ball ramp mechanism 95 and a power-operated operator (i.e., an electric actuator motor) adapted to actuate ball ramp mechanism 95 define clutch actuator 51. In one embodiment, axial needle bearing 91 is seated below radial plate segment 88 of drive gearwheel 57 and supports the latter with respect to input shaft portion 41 Specifically, axial needle bearing 91 is disposed between radial plate segment 88 of drive gearwheel 57 and a locater ring 97 that is axially retained relative to mainshaft 42 via a retainer clip 98 so as to axially locate drive gearwheel 57 and clutch basket 53 relative to mainshaft 42. A very small overall size can thus be selected, which entails advantages in terms of the degree of efficiency. In addition, axial bearing (axial needle bearing) 91 is arranged at the end of inlet neck portion 83 of first housing section 67, as a result of which a lubrication supply can also be ensured in the connect mode—all-wheel drive function, when the drivetrain is switched on. Axial needle bearing 93 is disposed between ball ramp mechanism 95 and another locator ring 127 that is axially retained relative to mainshaft 42 via another retainer Clip 129 so as to axially locate ballramp mechanism 95 relative to mainshaft 42. Both axial needle bearings 91, 93 are preferably configured as friction-optimized axial needle bearings (punctiform contact in the case of low load, linear contact in the case of high load), which makes minimized losses possible.

FIG. 3 illustrates ball ramp mechanism 95 to include a stationary first ring 125, a moveable second ring 131, and balls 133 disposed in aligned sets of cam tracks 135, 137 formed respectively in first and second rings 125, 131. The power-operated actuator associated with clutch actuator 51 is operable to rotate moveable ring 131 relative to stationary ring 125 which, in turn, also results in axial movement of moveable ring 131 relative to stationary ring 125. A pressure plate 139 is axially moveable with moveable ring 131 so as to control the clutch engagement force applied to the clutch pack of friction clutch 49. A radial needle bearing 141 is positioned between moveable ring 131 of ball ramp mechanism 95 and pressure plate 139.

In accordance with the following, the lubricating function associated with transfer gearbox 15 will now be described. In the state in accordance with FIG. 4, transfer gearbox 15 is operating in the connect mode—the all-wheel drive function is present or can be activated at any time, wherein chain 62 is running and chain sprocket 57 is rotating.

Figure 4:
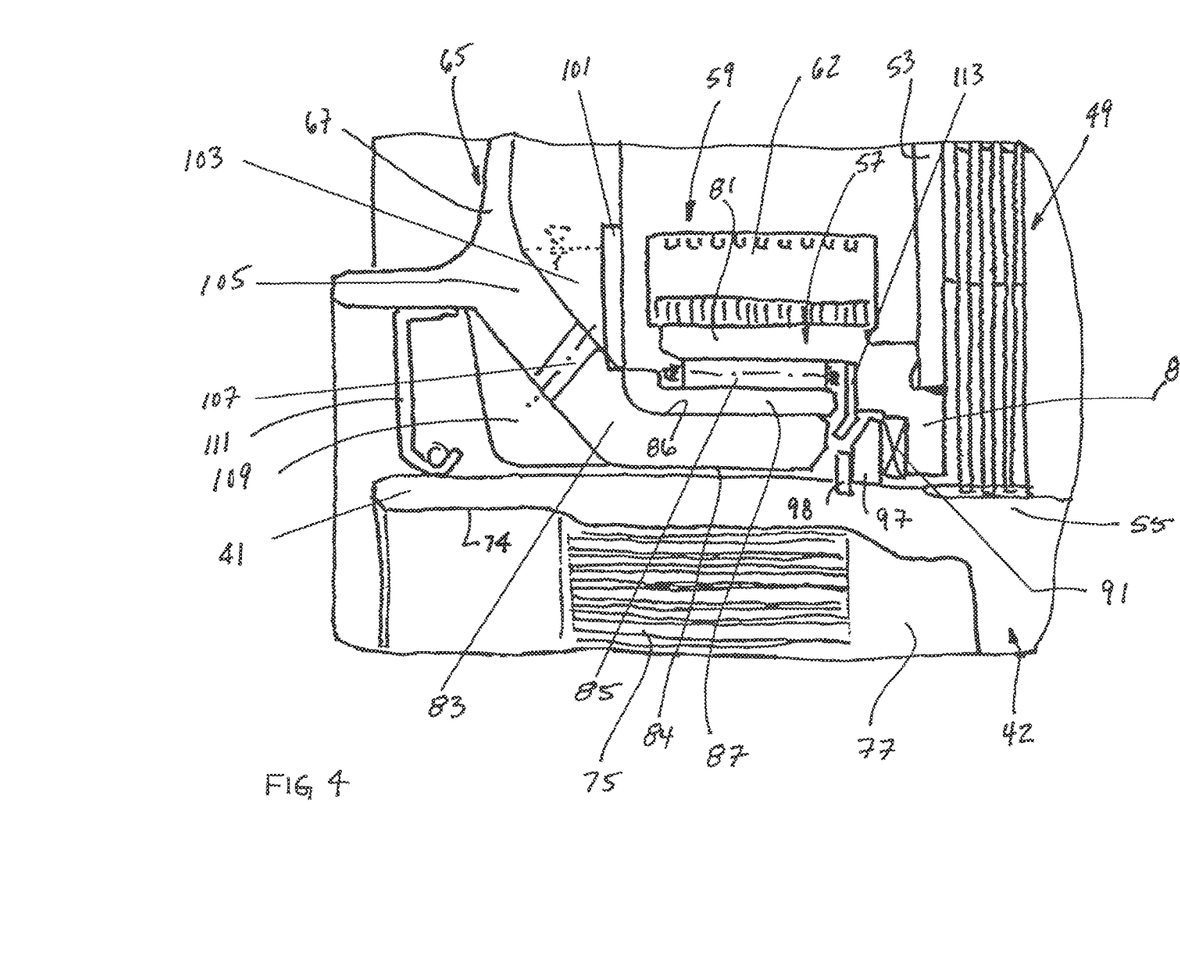
FIGS. 4 and 5 are enlarged partial views of the transfer gearbox shown in FIG. 3 which illustrate components associated with a mounting system and a lubrication system in greater detail.

A baffle plate 101 defines a small oil reservoir 103 in conjunction with a housing rib portion 105 of first housing section 67, which oil reservoir 103 is filled by oil sprayed off of chain 62 in response to rotation of drive gearwheel 57. Oil can flow through a supply bore 107 formed in inlet neck portion 83 and into an intermediate space 109 formed between input shaft portion 41 of mainshaft 42 and first housing section 67 and enclosed by a sealing ring 111. If space 109 surrounding input shaft portion 41 is filled with oil, both radial needle bearing 85 and axial needle bearing 91 are supplied with oil. A deflection plate 113 which rotates with chain sprocket 57 divides the oil supply for the two needle bearings 85 and 91. Furthermore, under centrifugal force, deflection plate 113 produces an accumulation space which backs up the oil as far as the inner edge and also forces the oil into axial needle bearing 91 counter to the centrifugal force. The lubrication of radial needle bearing 85 from the inside to the outside also ensures that frictional corrosion does not occur, since needle bearing 85 can be supplied sufficiently with oil.

Figure 5:
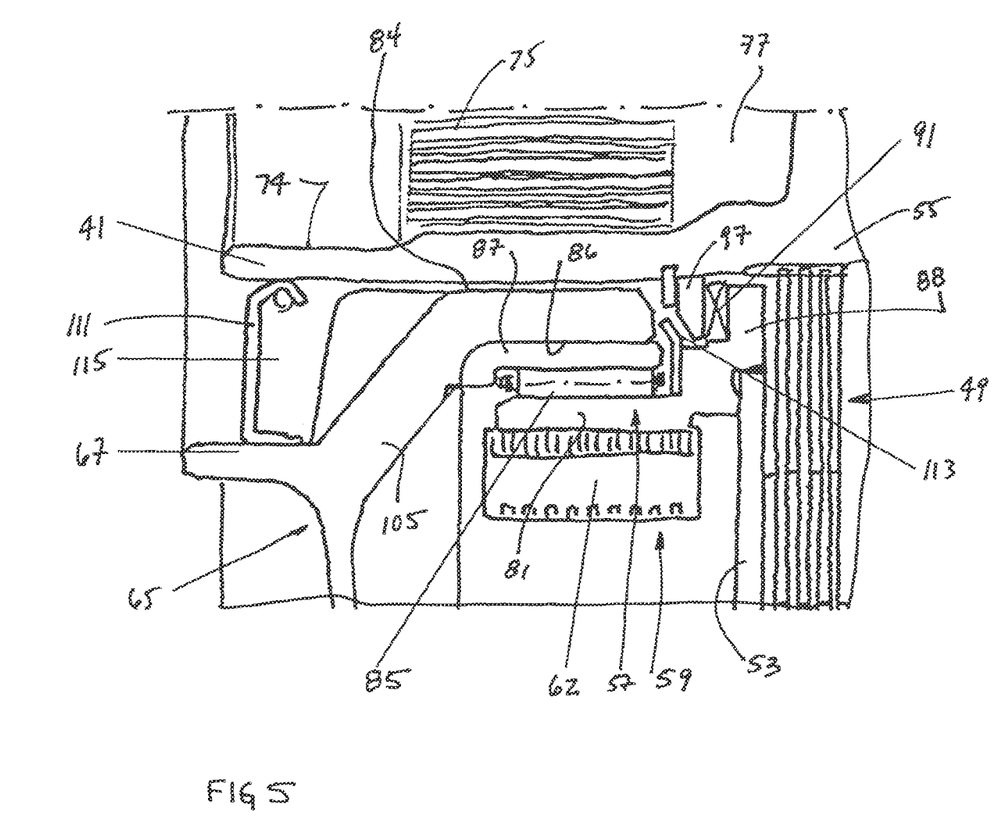

The lubrication in the disconnect mode—all-wheel drive function not present, chain 62 and chain sprocket 57 are at a standstill wherein FIG. 5 illustrates the lower part here, that is the part of chain sprocket 57 below input shaft portion 41.

In the disconnect mode—chain sprocket 57 is at a standstill—, it is not necessary to supply oil to radial needle bearing 85. Another small oil reservoir 115 is formed in the lower region as a result of deflection plate 113, which small oil reservoir 115 supplies the needles of axial needle bearing 91 for a relatively long time with a small quantity of oil. As long as oil reservoir 103 (formed by baffle plate 101—the underside is shown here in accordance with FIG. 5) is filled with oil, the oil supply of axial needle bearing 91 can be maintained by continued flowing for a certain time. If no more oil is also replenished from oil reservoir 103, the residual oil retained in small oil reservoir 115 still remains in the lower region of axial needle bearing 91.

Figure 6:
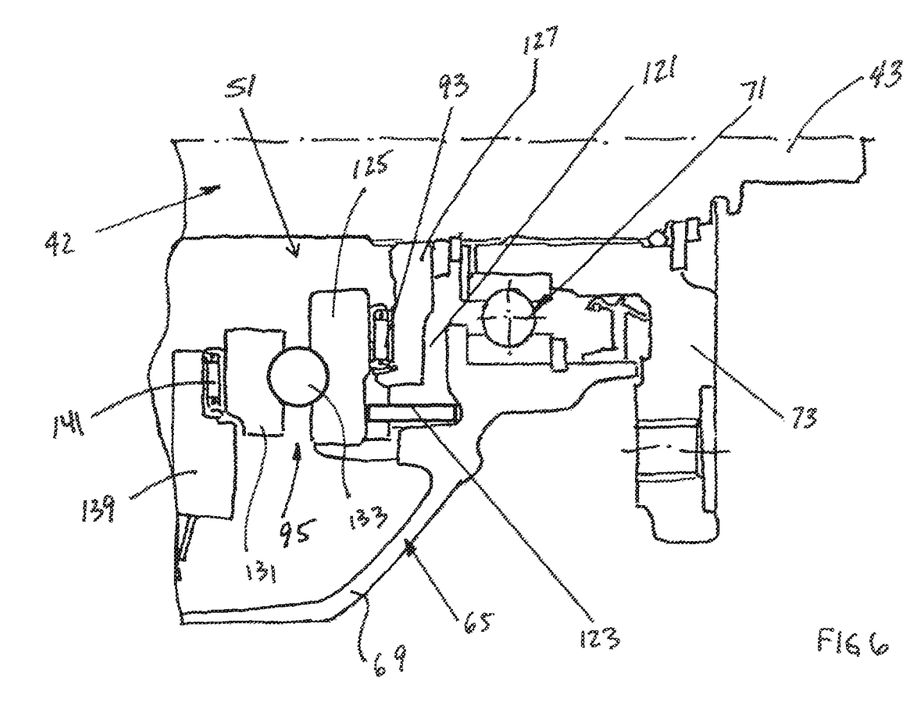
FIG. 6 is an enlarged partial view taken from FIG. 3 showing components of a clutch actuation mechanism and the lubrication system.

FIG. 6 illustrates the lubrication in the disconnect mode of components located in second housing section 69. An oil reservoir 121 is provided (on the output shaft side 43 of mainshaft 42) by way of a sealing element 123 (plastic or rubber) between second housing section 69 and stationary part 125 of ball ramp mechanism 95, whereby second oil reservoir 121 supplies all rotating parts (groove ball bearing 71 and axial needle bearing 93) in the disconnect mode with oil for a certain time. An upper, higher reservoir (similar to baffle plate 101 —cf. FIG. 4) can also be produced here, as on the drive side, by virtue of the fact that oil is replenished through a supply bore into the reservoir, in order to additionally compensate for leaks for a certain time.

Figure 7:
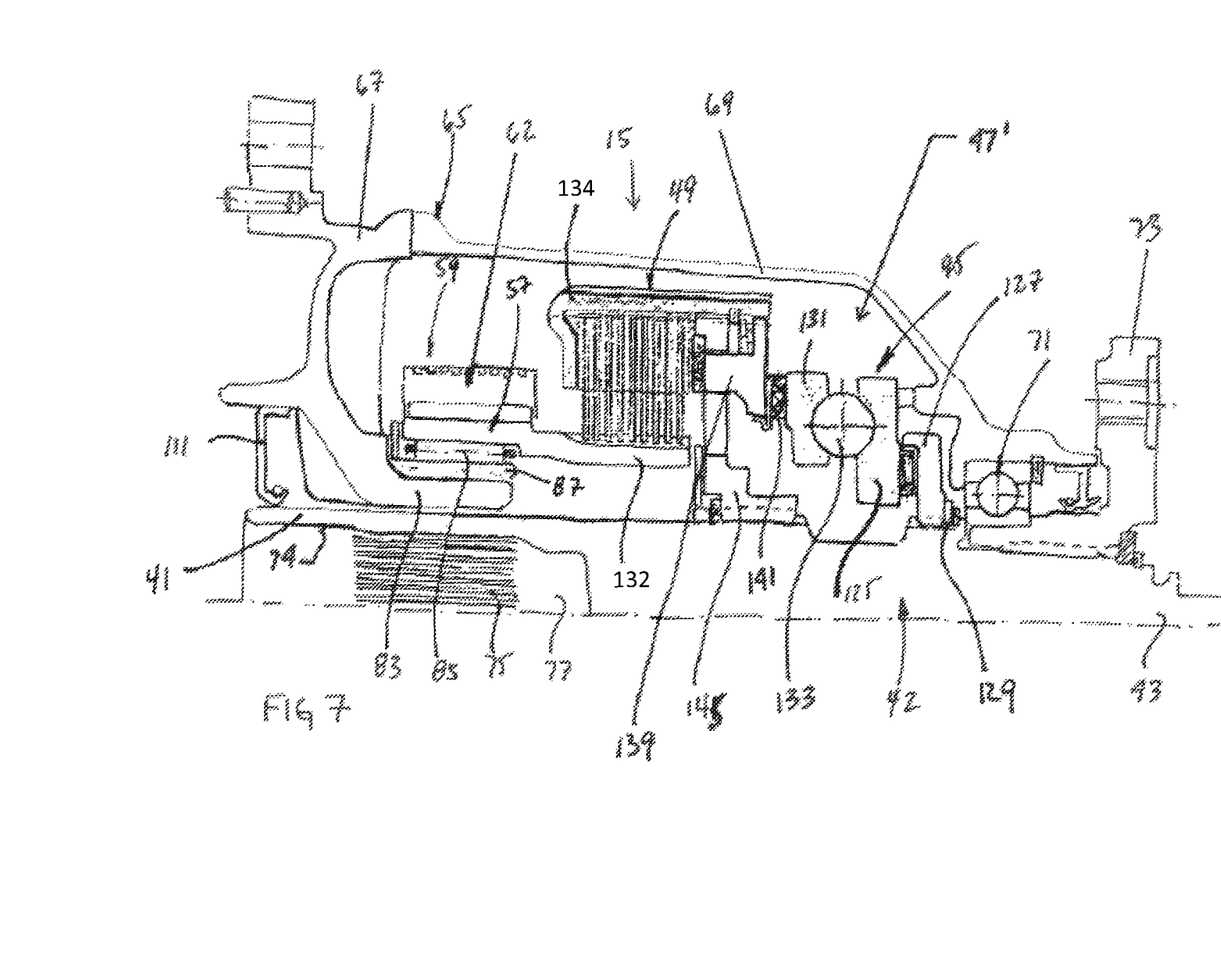
FIG. 7 is a partial sectional view of a transfer gearbox constructed in accordance with a second embodiment of the present disclosure and which is adapted for use with the drivetrain of FIG. 1.
Figure 10:
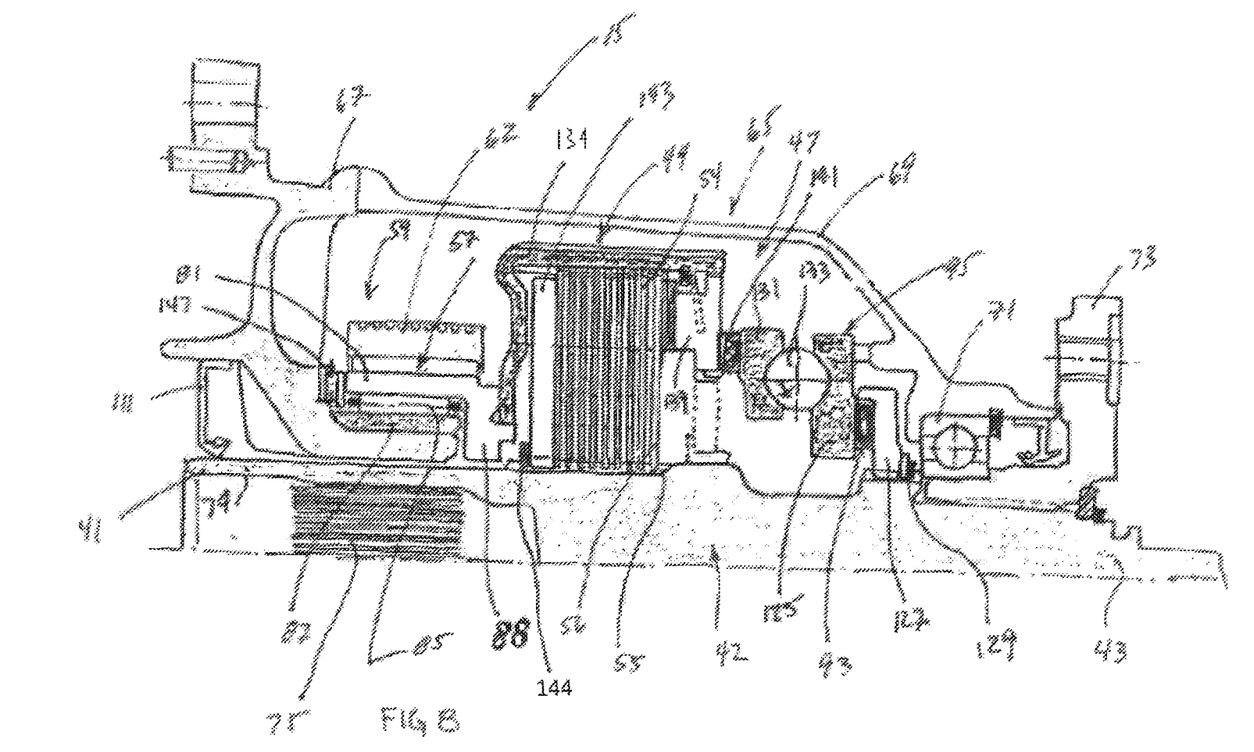

FIGS. 7 and 8 illustrate further mounting configurations for transfer gearboxes of the invention. Chain sprocket 57 is free of axial forces in the embodiment in accordance with FIG. 7. A revised version of clutch unit 47' is shown to include a clutch hub 132 and a clutch basket 134 with the multi-plate clutch pack of alternating inner plates 56 and outer clutch plates 54 therebetween. Here, clutch hub 132 is coupled directly to chain sprocket 57. The actuator system—ball ramp mechanism 95—acts directly on one side and via the clutch basket 134 from the other side on the clutch pack of friction clutch 49. Accordingly, a part of the actuating system, shown as an axially securing drive plate 145, is fixed axially on mainshaft 42 such that no axial forces act on clutch hub 132 and chain sprocket 57. Drive plate 145 is configured to have a first portion fixed (i.e. splined) for rotation with mainshaft 42 and a second portion fixed (i.e. splined) for rotation with clutch basket 134, thereby coupling clutch basket 134 for common rotation with mainshaft 42. Actuation of ball ramp mechanism 95 controls the amount of drive torque transmitted from clutch basket 134 to clutch hub 132 through engagement of the clutch pack.

In the version of transfer gearbox 15 constructed in accordance with FIG. 8, chain sprocket 57 is again coupled to clutch basket 134. The assembly of the clutch plates of friction clutch 49 is fixed axially via a pressure plate 143 and an axial securing ring 144 with respect to mainshaft 42, with the result that the actuator system of clutch unit 47—ball ramp mechanism 95—does not transmit any axial forces to the chain sprocket 57. A radial needle bearing 147 is shown located between first housing section 67 and an end of hub portion 81 of chain sprocket 57.

What is claimed is:

1. A distribution gearbox for distributing a drive torque produced by a drive unit of a motor vehicle to a first axle and a second axle of the motor vehicle, the distribution gearbox comprising:
    a housing having a first housing section and a second housing section, wherein the first housing section is configured to include an annular inlet neck portion and the second housing section is configured to include an outlet portion;
    a mainshaft having an input shaft portion passing through the inlet neck portion of the first housing section and an output shaft portion rotatably supported by the outlet portion of the second housing section, wherein the input shaft portion is adapted to receive the drive torque from the drive unit and the output shaft portion is adapted to transmit the drive torque to the first axle;
    a second shaft rotatably supported by the housing offset and parallel with respect to the mainshaft and which is adapted to be drivingly connected to the second axle;
    a power transfer mechanism having a first gearwheel rotatably supported by a bearing on the inlet neck portion of the housing, and a second gearwheel fixed for rotation with the second shaft and being drivingly coupled to the first gearwheel; and
    a clutch unit having a friction clutch operably disposed between the mainshaft and the first gearwheel, and a clutch actuator operable for engaging the friction clutch for transmitting drive torque from the mainshaft to the second shaft through the friction clutch and the power transfer mechanism,
    wherein the inlet neck portion of the housing includes a tubular hub section extending axially between the input shaft portion of the mainshaft and a cylindrical hub segment of the first gearwheel, wherein the bearing is disposed between the tubular hub section of the inlet neck portion and the hub segment of the first gearwheel, wherein the inlet neck portion further includes a conical section interconnected to the tubular hub section, and wherein the conical section includes a supply bore configured to permit a lubricant collected upon rotation of the first gearwheel to be directed to a lubricant path supplying the lubricant to the bearing.

2. The distribution gearbox of claim 1 wherein the first gearwheel further includes a radial plate segment fixed for rotation with the cylindrical hub segment, and wherein a second bearing is disposed between the radial plate segment of the first gearwheel and a locator plate that is axially secured to the mainshaft.

3. The distribution gearbox of claim 2 wherein the friction clutch includes a first clutch member fixed for rotation with the first gearwheel, a second clutch member fixed for rotation with the mainshaft, and a clutch pack operably disposed between the first and second clutch members, wherein the clutch actuator is configured to generate and apply a clutch engagement force to the clutch pack, and wherein the friction clutch is located between the first gearwheel and the clutch actuator.

4. The distribution gearbox of claim 3 wherein the first clutch member is a clutch basket and the second clutch member is a clutch hub fixed to or formed integrally on the mainshaft.

5. The distribution gearbox of claim 3 wherein the first clutch member is a clutch hub and the second clutch member is a clutch basket.

6. The distribution gearbox of claim 1 wherein the output shaft portion of the mainshaft is rotatably supported in the second housing section of the housing by a second bearing, wherein the input shaft portion of the mainshaft extends through a hub segment of the first gearwheel, and wherein the input shaft portion of the mainshaft is not supported by a bearing relative to the first housing section of the housing.

7. The distribution gearbox of claim 1 wherein the power transfer mechanism further includes a continuous drive chain encircling and drivingly connecting the first and second gearwheels.

8. The distribution gearbox of claim 1 wherein the power transfer mechanism further includes a third gearwheel located between and in meshed engagement with both of the first and second gearwheels.

9. A distribution gearbox for distributing a drive torque produced by a drive unit of a motor vehicle to first and second axles of the motor vehicle, comprising:
    a housing having a front housing section and a rear housing section, wherein the front housing section is configured to include an annular inlet neck portion terminating in a tubular hub section;
    a mainshaft disposed within the housing for rotation about a first rotary axis and having an input shaft portion extending through the tubular hub section of the inlet neck portion of the front housing section and having an output shaft portion rotatably supported by a first bearing in the rear housing section, the input shaft portion adapted to receive the drive torque from the drive unit and the output shaft portion adapted to transmit the drive torque to the first axle;

a second shaft rotatably supported by the housing for rotation about a second rotary axis that is offset and parallel to the first rotary axis, the second shaft being adapted for connection to the second axle;

a chain and sprocket drive assembly having a drive gearwheel rotatably supported on the tubular hub section of the inlet neck portion via a second bearing, an output gearwheel fixed for rotation with the second shaft, and a continuous drive chain encircling and drivingly connecting the drive gearwheel for rotation with the output gearwheel; and a clutch unit surrounding the mainshaft and having a friction clutch operably disposed between the mainshaft and the drive gearwheel and a clutch actuator operable for selectively engaging the friction clutch for transmitting the drive torque from the mainshaft to the second shaft through the friction clutch and the chain and sprocket drive assembly, wherein the friction clutch includes a clutch basket fixed for rotation with the drive gearwheel and a multi-plate clutch pack disposed between the clutch basket and the mainshaft or a clutch hub fixed for rotation with the mainshaft, and wherein the friction clutch is disposed between the drive gearwheel and the clutch actuator along the mainshaft;

wherein the drive gearwheel includes a cylindrical hub segment surrounding the tubular hub section of the front housing section and a radial plate segment, wherein the second bearing is disposed between the hub segment of the drive gearwheel and the hub section of the inlet neck portion, wherein a third bearing is disposed between the radial plate segment of the drive gearwheel and a locator plate axially mounted to the mainshaft, and wherein a supply bore formed through the inlet neck portion permits a lubricant discharged from the drive gearwheel to flow into a lubricant flow path communicating with the second and third bearings.

10. The distribution gearbox of claim 9 wherein the second bearing is a radial needle bearing and the third bearing is an axial needle bearing.

\* \* \* \* \*